(12) United States Patent
Green

(10) Patent No.: US 7,377,529 B2
(45) Date of Patent: May 27, 2008

(54) ACTIVE ROLL CONTROL SYSTEM FOR A VEHICLE SUSPENSION SYSTEM

(75) Inventor: Steve J. Green, Clarkson, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 443 days.

(21) Appl. No.: 11/000,347

(22) Filed: Nov. 30, 2004

(65) Prior Publication Data

US 2006/0113740 A1 Jun. 1, 2006

(51) Int. Cl.
*B60G 21/055* (2006.01)

(52) U.S. Cl. ............................................. 280/124.107

(58) Field of Classification Search ......... 280/124.107, 280/124.108; 74/29, 89.16, 89.17, 422, 500
See application file for complete search history.

(56) References Cited

U.S. PATENT DOCUMENTS

| | | | |
|---|---|---|---|
| 1,213,800 A * | 1/1917 | Piper | ........................... 254/294 |
| 2,034,400 A | 3/1936 | Kesling | |
| 5,052,303 A | 10/1991 | Edminster | |
| 5,186,486 A | 2/1993 | Hynds et al. | |
| 6,175,792 B1 | 1/2001 | Jones et al. | |
| 6,581,910 B1 | 6/2003 | Granafa | |

FOREIGN PATENT DOCUMENTS

| DE | 20 2004 001 614 U1 | 7/2004 |
|---|---|---|
| FR | 2 662 734 A1 | 12/1991 |
| GB | 2 377 415 A | 1/2003 |

OTHER PUBLICATIONS

Author Unknown, "TRW Advances Vehicle Safety With Active Roll Control"; Asianet, Tuesday, Aug. 7, 2001 [retrieved on Jun. 24, 2004]. Retrieved from the Internet: <URL: http://archive-an.aap.com.au/asianet.nsf/0/6dbc7cc3bf7e9f0e4a256ad4000b4a7f!OpenDoc... (Full URL not available).
Author Unknown, "TRW Advance Vehicle Safety With Active Roll Control"; NewsCom [retrieved on Jun. 24, 2004]. Retrieved from the Internet: <URL: http://prn.newscom.com/cgi-bin/pub/s!f=PRN/prnpub&p1=20010807/DCTU001-c&xtag=... (Full URL not available).
Whitfield, Kermit, "TRW's ARC Toward Better Dynamic Control"; Automotive Design & Production [retrieved on Jun. 24, 2004]. Retrieved from the Internet: <URL: http://www.autofieldguide.com/articles/article_print1.cfm.
Author Unknown, "Steering & Suspension"; TRW Automotive Products & Technologies, ®TRW Automotive 2004 [retrieved on Jun. 24, 2004]. Retrieved from the Internet: <URL: http://www.trw.com/productsandtechnologies/main/0,2650,9_30_77_2064206206,00.h... (Full URL not available).

* cited by examiner

*Primary Examiner*—Faye M. Fleming
(74) *Attorney, Agent, or Firm*—MacMillan, Sobanski & Todd, LLC

(57) ABSTRACT

An actuator assembly for an active chassis of a motor vehicle that includes an actuator is disclosed. The actuator includes a first rack and a second rack, and a drive pinion that is in operative engagement with the first and second racks. Substantially linear movement of the first and second racks in opposite directions causes rotational movement of the drive pinion. The assembly also includes a locking mechanism wherein the locking mechanism prevents rotation of the drive pinion and linear movement of the racks.

19 Claims, 3 Drawing Sheets

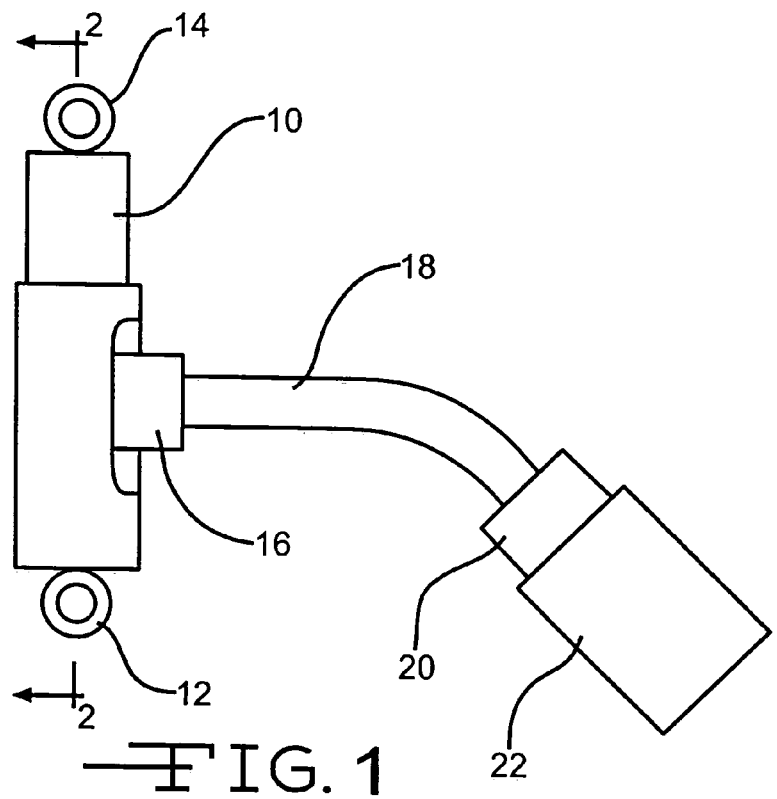
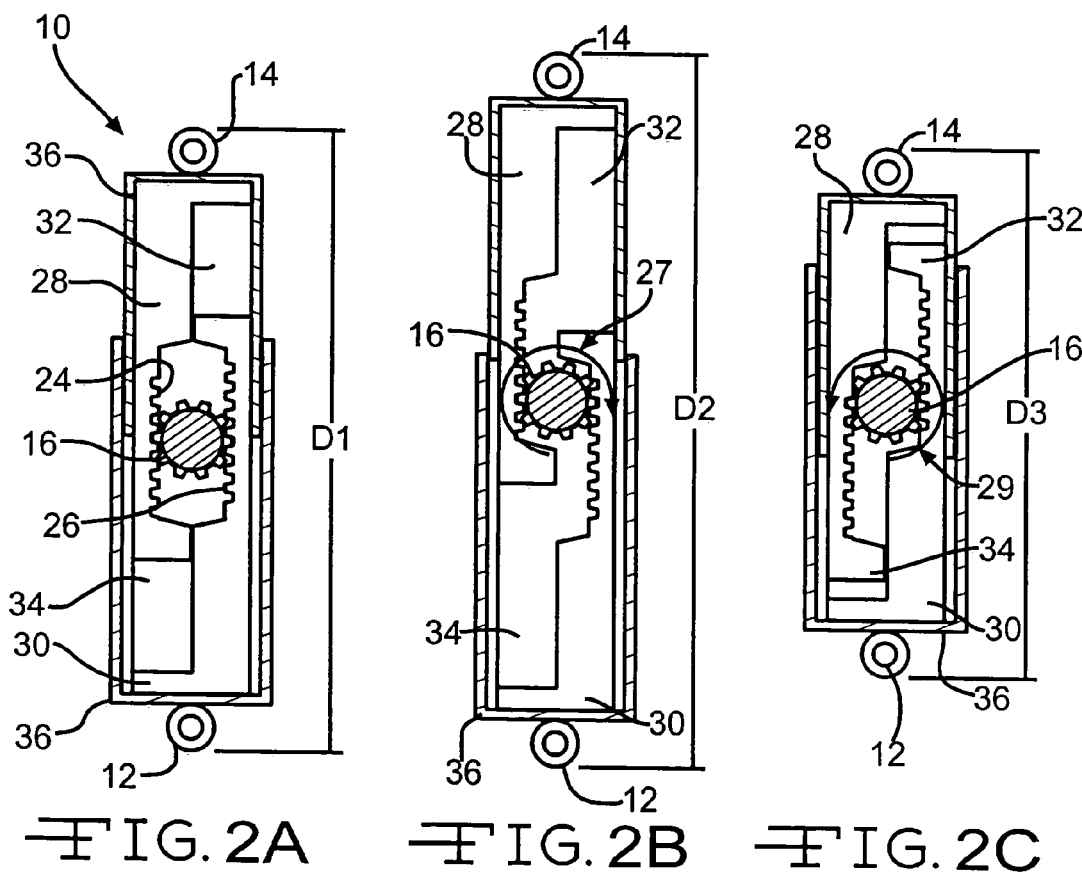

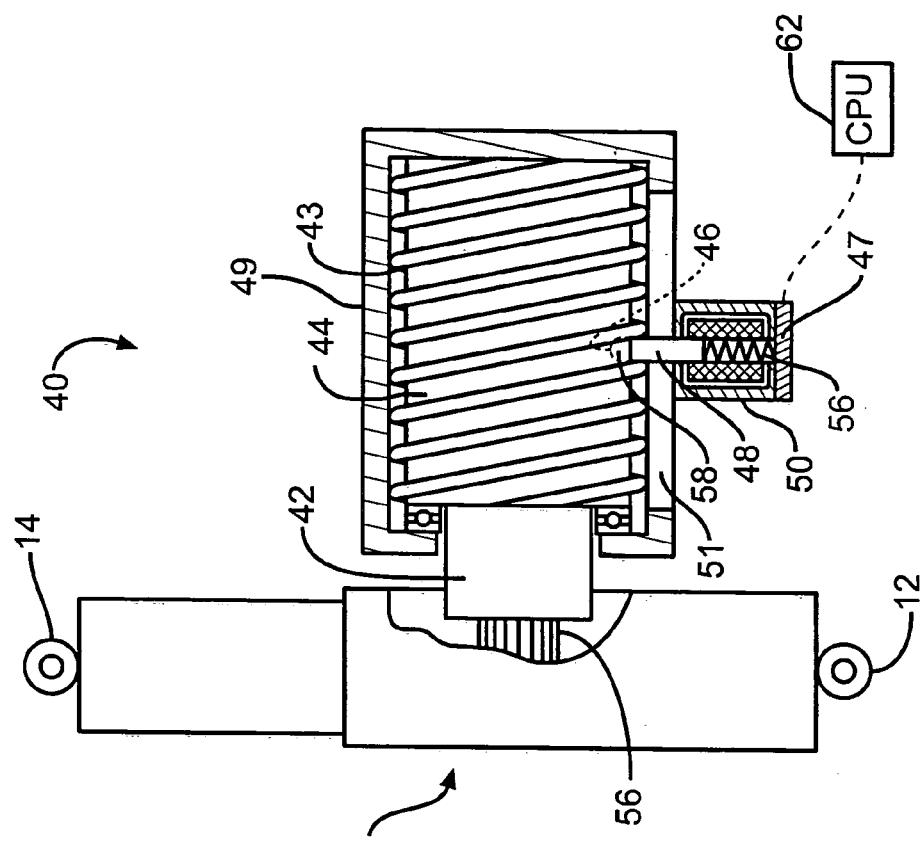
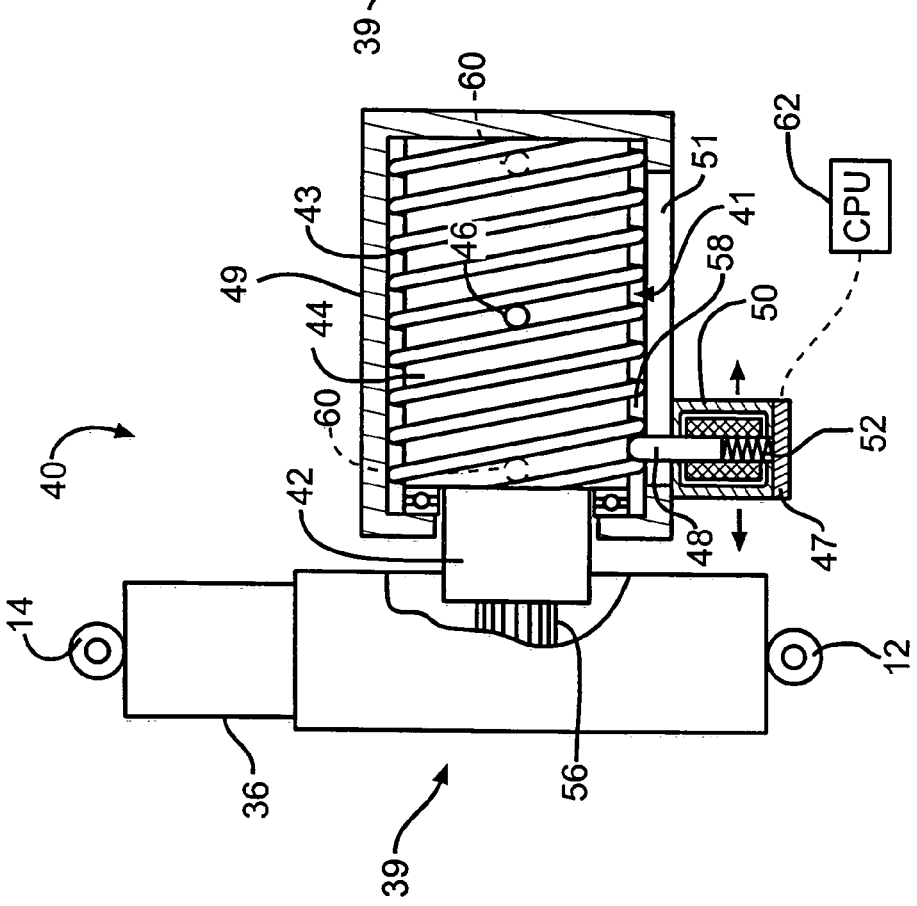

ACTIVE ROLL CONTROL SYSTEM FOR A VEHICLE SUSPENSION SYSTEM

CROSS REFERENCE TO RELATED APPLICATIONS

This application is related to pending International Application No. DE 20 2004 001 614 U1 filed Feb. 3, 2004, the disclosure of which is incorporated by reference in entirety herein.

BACKGROUND OF THE INVENTION

This invention relates in general to an active roll control system for use in a vehicle suspension system, and is more particularly directed to an apparatus and method for improving the dynamic response of such an active roll system.

Vehicle suspension systems have as their goal the control of chassis motion during vehicle operation. One operating motion characteristic, which is controlled by known suspension systems, is chassis roll. A vehicle typically experiences chassis roll during a turning or cornering maneuver. During chassis roll, the chassis tilts or "rolls" about the vehicle's fore-to-aft axis toward an outside direction of the turn.

It is known to counteract the roll effect of the chassis by providing an opposing force to the chassis. Several methods are known to apply the opposing force. One method includes applying a chassis lifting force via corner actuators located on the vehicle side that is on the outside of the turn and/or a chassis lowering force via corner actuators located on the vehicle side that is on the inside of the turn.

Another known method is to utilize a stabilizer bar that extends laterally across the vehicle. The stabilizer bar, which is also known as a roll-control bar, acts as a torsion spring to apply the opposing force. Further, it is known to vary the opposing force that the stabilizer bar applies to the chassis. One way to vary the opposing force is to utilize and control one or more hydraulic actuators in the connection of the stabilizer bar. An example of such a system is shown in U.S. Pat. No. 5,362,094 to Jensen.

To determine the amount of roll-opposing force to be applied to the chassis, such active vehicle suspension systems require an indication of lateral acceleration to which the vehicle is subjected during the turning or cornering maneuver. In one known system, an estimated value of lateral acceleration is calculated. The lateral acceleration calculation requires a sensory input from a steerable road wheel angle sensor, a sensory input from a vehicle velocity sensor, and the value of the vehicle wheel base dimension. In one example, the road wheel angle sensor is a steering shaft angle sensor and the vehicle velocity sensor is a drive-train (e.g., transmission) sensor. Such systems can include the use of pumps and control valves directed by an electronic control unit. Such a system requires many components thereby leading to an increased cost.

Both hydraulic as well as electromechanical actuators are known. One example for a hydraulic actuator is a positioning cylinder which is actuated by hydraulic fluid. The advantage of such a system is that the actuator is of a relatively small size, while at the same time having a relatively high efficiency. That is attributable to the fact that the drive source, i.e. the hydraulic pump, may be spaced apart from the actuator. Also known are electromechanical actuators, in particular linear drives. However, these linear drives require comparatively large construction spaces in the case of high power demands, because in their case the drive source, i.e. the electromotor, cannot be spaced apart from the actuator.

Therefore, it would be advantageous to provide an electromechanical actuator, in particular a linear drive, which is characterized by a relatively small construction space while having a relatively high efficiency that provides a system to improve ride handling including a reduction in body roll which is simple and low cost.

SUMMARY OF THE INVENTION

This invention relates to an actuator assembly for an active chassis of a motor vehicle that includes an actuator. The actuator includes a first rack and a second rack, and a drive pinion that is in operative engagement with the first and second racks. Substantially linear movement of the first and second racks in opposite directions causes rotational movement of the drive pinion. The assembly also includes a locking mechanism wherein the locking mechanism prevents rotation of the drive pinion and linear movement of the racks.

The invention also relates to a vehicle suspension system having an active roll control mechanism that includes a vehicle body, a chassis, a stabilizer bar connecting the vehicle body to the chassis, and an actuator assembly. The actuator assembly is operatively connected between the stabilizer bar and the vehicle body and is operable to selectively lock and unlock the stabilizer bar in position relative to the vehicle chassis and vehicle body to provide structural support.

Other advantages of this invention will become apparent to those skilled in the art from the following detailed description of the preferred embodiments, when read in light of the accompanying drawings.

BRIEF DESCRIPTION OF THE DRAWINGS

FIG. 1 is a schematic view of a first actuator for use in an active roll control system having a drive motor.

FIG. 2A is a schematic sectional view of a portion of the first actuator taken along line 2-2 of FIG. 1 showing the actuator in a mid-position.

FIG. 2B is a schematic sectional view of a portion of the first actuator taken along line 2-2 of FIG. 1 showing the actuator in an fully extended position.

FIG. 2C is a schematic sectional view of a portion of the first actuator taken along line 2-2 of FIG. 1 showing the actuator in a fully retracted position.

FIG. 3 is a view of an actuator assembly according to the present invention with a second actuator and having a portion of a scroll housing removed.

FIG. 4 is a view of the actuator assembly according to the present invention showing the second actuator in a locked position with a portion of the scroll housing removed.

DETAILED DESCRIPTION OF THE PREFERRED EMBODIMENTS

Figure 5:
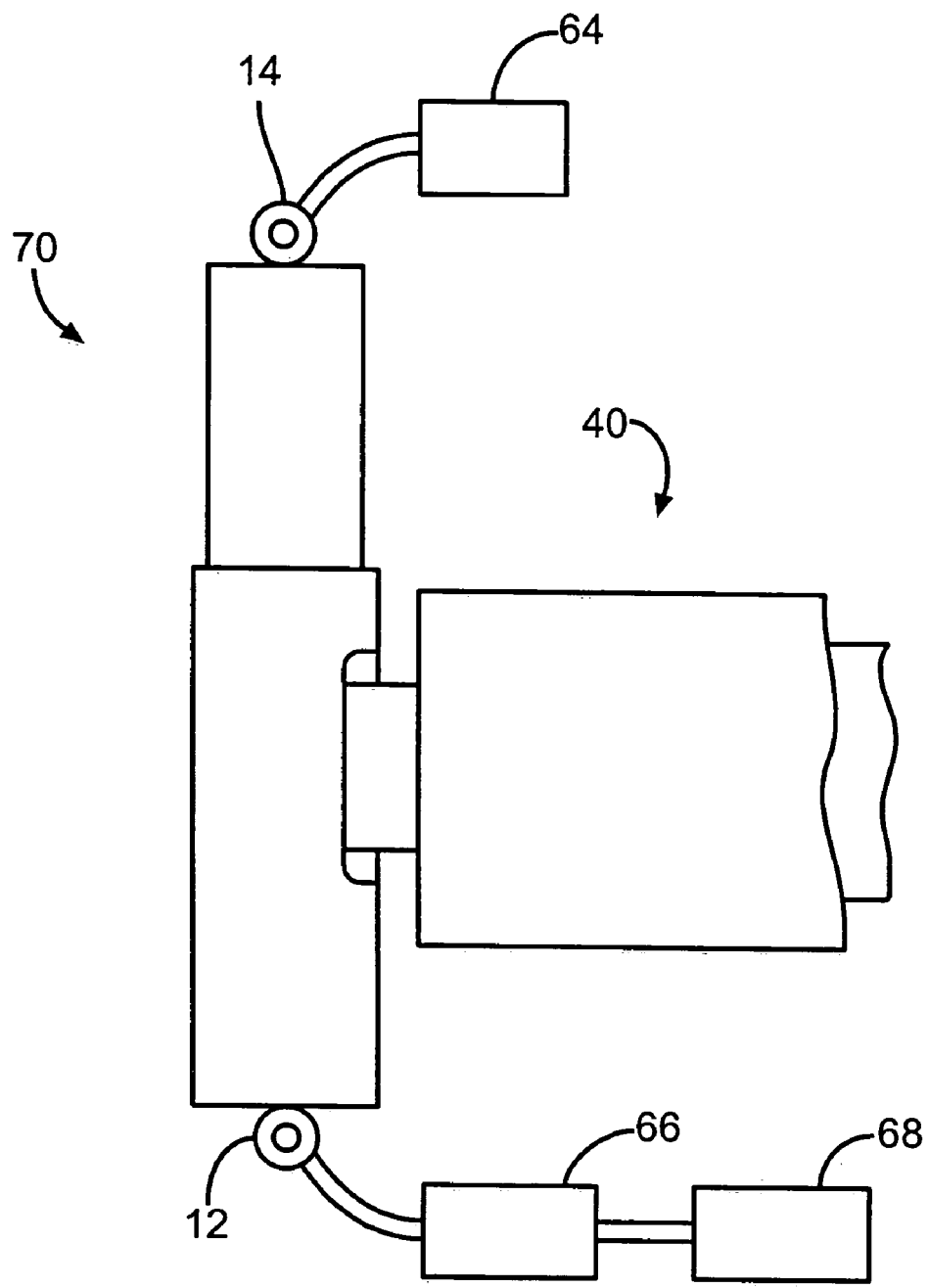
FIG. 5 is a schematic view of the actuator assembly according to the present invention incorporated in a vehicle suspension system.

According to the present invention, an active roll control (ARC) system is disclosed. Vehicles lean when cornering or turning due to the weight transfer imposed by lateral acceleration acting on the suspension. Factors contributing to the roll angle of the vehicle include vehicle height and suspension stiffness. ARC systems are known wherein hydraulic and electronic technologies are used to reduce or eliminate the vehicle roll angle in cornering or turning, which in turn improves handling. ARC systems combine typical steering and braking technologies such as pumps and pressure control valves with additional sensors, including a lateral accelerometer, a steering angle sensor, and with other sensors that typically already exist on many vehicles. ARC systems can also include an actuator at one end of both a front and rear stabilizer bar. During handling maneuvers, the accelerometer and sensor(s) sense the roll force created by the cornering or turning of the vehicle. The actuators then apply an offsetting force to the end of the stabilizer bar to reduce roll angle and assist the vehicle in maintaining a stable operating condition. These actuators are effectively inactive during normal vehicle operation to allow for a softer ride. In generally straight-ahead driving, the stabilizer bar is free to move with wheel motions up to the stroke of the actuator. Since no pressure is generated in the actuators, the bar is, in effect, disconnected. In this condition, the ride of the vehicle is markedly improved, with little or no "head toss" and better single wheel bump performance. In addition, axle articulation is also improved for off-road use.

For this purpose it has been disclosed in German Patent Application DE 20 2004 001 614 U1, filed Feb. 3, 2004, and illustrated in FIGS. 1 and 2A-2C, a first actuator, indicated at 10, having a first toothed rack 24, a second toothed rack 26 and a drive pinion 16. The drive pinion 16 operatively engages the two toothed racks 24 and 26 and is adapted to move the latter in directions opposite to one another. The first actuator 10 is distinguished because of the particularly small construction space that is required. The size efficiency of the first actuator 10 is achieved because by using two toothed racks 24 and 26 moving in directions opposite to one another doubles the effective working stroke of the first actuator 10 compared to an actuator having a single toothed rack. Thus, referring to the effective actuator stroke, this results in a lower construction space requirement. The term "stroke" is known in the art to be the total of the travel distance of the two racks 24 and 26 as they move within the first actuator 10. The drive pinion 16 may simultaneously be driven by an electrical drive motor 22 that is remote from or spaced apart from the first actuator 10 and connected thereto via a drive shaft 18 or other suitable means. Thus, the drive means of the first actuator 10 may be arranged angularly and spatially offset from the motor 22, which offers additional advantages with regard to the construction space required for the first actuator 10.

Referring more specifically to the drawings, there is illustrated in FIG. 1 the first actuator 10 which includes a first fastening eye or member 12 and a second fastening eye or member 14. When the first actuator 10 is used in an active chassis system of a vehicle, the first fastening eye 12 may, for example, be attached to a stabilizer bar (not shown) of the vehicle chassis (not shown) and the second fastening eye 14 may be attached to the vehicle body (not shown). The first actuator 10 comprises a drive pinion 16 which is operative to cause a linear stroke of the first actuator 10 which in turn is operative to cause movement of the two fastening eyes 12, 14 towards or away from each other. The drive pinion 16 is actuated via the drive shaft 18 which is connected to a gear 20 which is connected to the drive motor 22. The drive shaft 18 may be a propeller shaft or a flexible shaft so that the drive motor 22 may be accommodated at a distance from the first actuator 10 at a suitable location in the vehicle, in particular at a location where sufficient construction space is available.

Referring now to FIGS. 2A, there is illustrated a sectional view through a portion of the first actuator 10 showing the first actuator 10 in a mid-position or normal position. As shown therein, the drive pinion 16 operatively engages the two toothed racks 24, 26 which are operatively coupled to a tappet 28 and 30, respectively. In the illustrated embodiment, the two tappets 28 and 30 are preferably telescopically mounted, that is, the tappet 30 slides into a mount 32 of the tappet 28 and the tappet 28 slides into a mount 34 of the tappet 30. Additionally, a telescoping outer cover or outer housing 36 is preferably provided. The cover 36 is optionally used to protect the components of the first actuator 10 contained therein from the damage and/or exposure to the elements, the weather and the like.

Referring to FIGS. 2A-2C, the operation of the first actuator 10 will be discussed. When, starting from the normal position shown in FIG. 2A, the two fastening eyes 12, 14 define a first distance D1 therebetween. Next, when the drive pinion 16 is rotated in a clockwise direction (indicated generally by the arrow 27 in FIG. 2B), the two tappets 28, 30 are forced outwardly or moved away from each other to an extended position. In the approximately fully extended position illustrated in FIG. 2B, the two fastening eyes 12, 14 are operative to define a second distance D2 therebetween which is greater that the first distance D1. When the drive pinion 16 is rotated in the opposite direction (indicated generally by the arrow 29 in FIG. 2C), the two tappets 28, 30 are moved inwardly toward each other to a retracted position. In the fully retracted position shown in FIG. 2C, the two fastening eyes 12, 14 are operative to define a third distance D3 therebetween which is less than the first distance D1. In this manner a linear actuator 10 that is operative to provide a comparatively large stroke while having a small construction space is shown.

Referring now to FIG. 3 and using like reference numbers to indicate corresponding parts, there is illustrated an actuator assembly, indicated generally at 40, according to the present invention. The two toothed racks 24 and 26 which are a part of the tappets 28 and 30, respectively, and as were shown in FIGS. 2A-2C, are also included within the cover 36 of a second actuator 39. The second actuator 39 includes the two tappets 28 and 30 which are telescopically mounted, such as was described above in connection with FIGS. 1 and 2A-2C, for selectively moving the second actuator 39 to a desired stroke position. The desired stroke position of the second actuator 39 is defined by the position of two fastening eyes 12 and 14 with respect to each other and is any of the number of positions defined between the fully retracted position shown in FIG. 2C and the fully extended position shown in FIG. 2B. In the present embodiment, the second actuator 39 is preferably not operated by an electric motor and does not include the drive shaft 18, gear 20, and the electric motor 20 shown in connection with the first actuator 10 illustrated in FIG. 1, but rather is preferably free to move with the motion of the vehicle. However, the actuator assembly 40 can be operated by an electric motor if so desired. Since, in the preferred embodiment, there is no motorized operation of the second actuator 39, the tappets 28 and 30 are free to move together and apart from one other simply due to the motion of the vehicle, and thus, without the implementation of the stabilizer bar in the vehicle suspension assembly. The actuator assembly 40 includes a drive shaft 42 that is connected to and positioned substantially coaxially with a scroll 44. It should be appreciated that the scroll 44 and drive shaft 42 can be formed integrally as one piece or can be separate components operatively coupled together for actuating the tappets 28, 30 of the second actuator 39. Additionally, the drive shaft 42 can have a drive pinion 56 that extends from the drive shaft 42 into the cover 36 of the second actuator 39. The drive pinion 56 can be formed integrally with the drive shaft 42 or can be a separate component that is operably coupled with the drive shaft 42 for rotation therewith. It should also be appreciated that the scroll 44 can be directly coupled with the drive pinion 56 without the drive shaft 42 if so desired. The drive pinion 56 is preferably substantially similar in form and function to the drive pinion 16 of the first actuator 10 in that rotation of the drive pinion 56 causes axial movement of the tappets 28 and 30, and vice versa, in a manner that is similar to that which was described above.

As with the first actuator 10 shown in FIGS. 1 and 2A-2C, as the tappets 28 and 30 move, a drive pinion 56 and the drive shaft 42 will rotate in either the clockwise or counterclockwise direction depending on whether the fastening eyes 12 and 14 are moving together or apart. Since the scroll 44 is part of or coupled to the drive shaft 42, such movement of drive shaft 42 will cause the scroll 44 to rotate with the movement of the drive shaft 42. In straight-ahead driving, the stabilizer bar (schematically shown in FIG. 5 by reference character 66), will be free to move with the vehicle's wheel motion up to the full or complete working stroke of the second actuator 39. Since no pressure is generated in the second actuator 39, the stabilizer bar is, in effect, disconnected from the vehicle suspension system 68 and the actuator assembly 40 will move such as is described herein.

Referring now to FIGS. 3 and 4, it is desired that the stabilizer bar is able to be locked in position within the vehicle suspension assembly. When the stabilizer bar is locked, the tappets 28 and 30 are substantially restricted from movement. To lock the tappets 28 and 30 and restrict such movement, the actuator assembly 40 includes a pin 48 to lock the movement of the scroll 44 thereby preventing rotation thereof. To control the movement and positioning of the pin 48 with the scroll 44, the scroll 44 preferably has an outer surface 43 with a track 41 formed thereon. The track 41 is used to provide a path for the pin 48 to follow until the pin 48 lines up with a cavity 46 formed on the scroll 44 (as shown in FIG. 4). The track 41 may appear as threads formed on the outer surface 43 of the scroll 44. However, the track 41 is preferably only used to define the path for the pin 48 during rotation of the drive shaft 42 and the scroll 44. Therefore, the width of the track 41 is preferably substantially equal to the width of a head 58 of the pin 48 so that the pin 48 is held substantially in the proper alignment.

In the preferred embodiment, the surface 43 of the scroll 44 includes a cavity 46 that is configured to receive the pin 48. As will be described below, when the pin 48 engages the cavity 46, this interaction is operative to act as a locking mechanism to prevent rotation of the scroll 44, and therefore the drive shaft 42 and the drive pinion 56. The pin 48 is connected to and selectively controlled by a solenoid 50 such that the solenoid 50 can be positioned in one of an non-actuated and actuated position to respectively move the pin 48 into one of an extended position and retracted position. The solenoid 50 is preferably contained within a housing 47 to protect it from the environment. Alternatively, the solenoid 50 could be connected to the pin 48 in a hinged arrangement (not shown) allowing the pin 48 to follow the track 41 even though the solenoid 50 is fixed. The scroll 44 is preferably contained within a housing 49 that can protect the scroll 44 from the elements and environment. The housing 49 preferably includes an opening 51 that the pin 48 and solenoid 50 can move along because as the scroll 44 rotates, the pin 48 will move laterally along the length of the scroll 44 in the track 41. Such movement can be clearly seen in FIGS. 3 and 4. Although it is shown with the solenoid 50 and pin 48 being located partly outside the housing 49, it should be appreciated that the solenoid 50 and pin 48 can be positioned within the housing as well, or have any other suitable arrangement.

As illustrated in FIG. 3, when the solenoid 50 is non-actuated, the pin 48 is in a partially extended position. In the preferred embodiment, the solenoid 50 is normally in the non-actuated position. A spring 52 of the solenoid 50 biases the pin 48 towards the scroll 44 and into contact with the surface 43 of the scroll 44 thus positioning the pin 48 in the partially extended position. As shown in FIG. 4, when the pin 48 becomes aligned with the cavity 46 (the pin-in-cavity engagement position), the spring 52 will bias the pin 48 into the filly extended position such that at least a portion of the pin 48 is received within the cavity 46. Therefore, it is also preferred that the cavity 46 preferably have a depth that can accommodate a substantial portion of the head 58 of the pin 48. By positioning the pin 48 within the cavity 46, the scroll 44 will be locked or substantially prevented from rotating. With the scroll 44 locked, the drive shaft 42 will also be prevented from rotating, and thus, the tappets 28 and 30 will also not move. In the locked position, the second actuator 39 will lock the stabilizer bar in position relative to the vehicle chassis. Therefore the actuator assembly 40 will be operative to apply an offsetting force to the end of the stabilizer bar which will reduce the roll angle of the vehicle and assist the vehicle in maintaining a stable operating condition.

The pin 48 can be retracted from the cavity 46, thereby disengaging the scroll 44 and allowing the scroll 44 to rotate, by actuating the solenoid 50. When the solenoid 50 is actuated, the spring 52 will become compressed thereby pulling the pin 48 towards the solenoid 50 against the force of the spring 52, and away from the scroll 44. Once the pin 48 is retracted from the cavity 46 and the scroll rotates out of the pin-in-cavity engagement position, the solenoid 50 can be returned to its normal non-actuated position wherein the pin 48 will move to the partially extended position and in contact with the surface 43 of the scroll 44. When the pin 48 encounters the cavity 46 again due to the rotational motion of the scroll 44 and the cavity 46 returns to the pin-in-cavity engagement position, the pin 48 will again extend completely and engage the cavity 46 of the scroll 44 to prevent rotation of the scroll 44. With the use of a mechanical locking mechanism such as is described herein, no sensors would be required to detect a locking position. The pin 48 will automatically move into engagement with the cavity 46 to lock the scroll 44 (and thus the actuator assembly 40) when the scroll 44 is in the proper predetermined position. When the scroll 44, and thus the second actuator 39, is unlocked, the scroll 44 and the actuator 39 are substantially unrestrained and can therefore move freely with the motion of the vehicle and vehicle chassis.

The cavity 46 is preferably located along the scroll 44 at a predetermined location to achieve the design aspects of the ARC system that are desired. For example, locking the scroll 44 in the mid-position (FIG. 2A) allows the stabilizer bar to add roll stiffness to the vehicle suspension system. The advantages of using the stabilizer bar during cornering, for example, are known in the art. Therefore, the pin 48 is preferably engaged with the cavity 46 when the control system detects changes using a lateral accelerometer, steering wheel angle, and road speed. The cavity 46 on the scroll 44 should therefore be positioned so that the stabilizer bar provides the desired amount of support during maneuvering that requires stabilization.

It can be appreciated that the cavity 46 can be formed on the surface 43 of the scroll 44 such that the actuator assembly 40 can be locked by engaging the scroll 44 with the pin 48 so that the scroll is locked at an expanded position, a mid-position, or a retracted position. The possible other locations of the cavity are indicated in phantom at 60. Additionally, there can be a plurality of cavities if so desired. With a plurality of cavities, the solenoid 50 could be controlled so that the pin 48 engages the cavities to lock the scroll 44 only at certain positions depending on other operating characteristics of the vehicle. Such a process is preferably controlled via a control system 62 including inputs from a plurality of sensors such as was described above. Locking the actuator assembly 40 with the tappets 28 and 30 closer together (FIG. 2C) or locking the actuator assembly 40 with the tappets 28 and 30 spaced apart (FIG. 2B) will change the working length of the second actuator 39 and can thereby affect the position of the associated stabilizer bar. Therefore, the position of the second actuator 39 can be selected depending on the desired stabilizer bar position. In the preferred embodiment, the cavity 46 is positioned so that the scroll 44 locks the actuator assembly 40 in a mid-position (similar to that which is shown in FIG. 2A).

It can be appreciated that the actuator assembly 40 according to the present invention can include a motor or other suitable device for driving the pinion 42 if so desired. An additional feature such as an electric motor (not shown but can be generally similar to the electric motor 22 shown in FIG. 1), will allow the actuator assembly 40 to be selectively controlled by the motor. A power controlled system would control the roll angle of the vehicle by progressively extending or compressing the second actuator 39 in response to the lateral acceleration of the vehicle reducing or eliminating the vehicle roll angle. Adding a motor for driving the pinion 42 would therefore allow the actuator assembly 40 to selectively and actively reduce the vehicle roll angle. A combination of a motor with the actuator assembly 40 according to the present invention therefore allows either motorized control of the actuator assembly 40 or mechanical locking of the actuator assembly 40 as was described above.

Illustrated in FIG. 5, there is schematically illustrated a vehicle suspension system, indicated generally at 70. A portion of the actuator assembly 40 shown in FIGS. 3 and 4 is shown, including the first fastening eye or member 12 and a second fastening eye or member 14. When the actuator assembly 40 is used in an active chassis system of a vehicle, the first fastening eye 12 may, for example, be attached to a stabilizer bar (illustrated schematically by reference numeral 66) of the vehicle chassis (illustrated schematically by reference numeral 68) and the second fastening eye 14 may be attached to the vehicle body (illustrated schematically by reference character 64). The second actuator 39, described above, is operative to cause a linear stroke which in turn is operative to cause movement of the two fastening eyes 12, 14 towards or away from each other. As was also described above, when the actuator assembly 40 is in an unlocked position, the stabilizer bar 66, and vehicle chassis 68 can move freely with respect to the vehicle body 64. When the actuator assembly 40 is locked, the stabilizer bar 66 becomes implemented within the ARC system to increase the system stiffness.

It should be appreciated that the actuator assembly 40, and particularly the pin 48 locking mechanism, can also be used as a safety mechanism. For example, the pin 48 can be used to lock the scroll 44 in the actuator assembly 40 which in turn locks the stabilizer in place if the drive pinion 56 breaks or otherwise fails.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. An actuator assembly adapted for use in a vehicle suspension system for selectively controlling the position of a stabilizer bar of the vehicle suspension system comprising:
   an actuator having a first rack and a second rack;
   a rotatable drive pinion in operative engagement with the first and second racks wherein substantially linear movement of the first and second racks in opposite directions causes rotational movement of the drive pinion; and
   a locking mechanism selectively moveable between a first position, wherein the locking mechanism prevents rotation of the drive pinion and linear movement of the first and second racks toward a retracted position and an extended position, and a second position, wherein the locking mechanism allows rotation of the drive pinion and linear movement of the first and second racks.

2. The actuator assembly defined in claim 1 wherein movement of the first rack and second rack causes the actuator to move between any one of an infinite number of positions defined between a fully extended position and a fully retracted position.

3. The actuator assembly defined in claim 2 wherein the locking mechanism comprises a scroll that is in operative engagement with the drive pinion for rotation therewith, and a pin that is configured to be selectively engaged in a cavity provided in the scroll to prevent rotation of the scroll.

4. The actuator assembly defined in claim 3 wherein the locking mechanism further comprises a solenoid, wherein the solenoid is selectively operable between a first actuated position and a second non-actuated position.

5. The actuator assembly defined in claim 4 wherein the pin is in one of an extended position and a partially extended position when the solenoid is in the non-actuated position and the pin is in a retracted position when the solenoid is in the actuated position.

6. The actuator assembly defined in claim 5 wherein the cavity is located on the scroll such that the pin engagement with the cavity locks the actuator in a position that is substantially at a mid-point between the extended position and the retracted position.

7. The actuator assembly defined in claim 6 wherein the solenoid is actuated to retract the pin from engagement with the scroll and to unlock the actuator.

8. The actuator assembly defined in claim 3 wherein the scroll further includes a plurality of cavities such that the pin can engage a selected one of the plurality of cavities to lock the actuator in one of a selected plurality of positions.

9. The actuator assembly defined in claim 8 wherein the plurality of cavities are located on the scroll such that pin engagement with one of the cavities will lock the actuator in one of a mid-position, an extended position, and a retracted position.

10. A vehicle suspension system comprising:
    a vehicle body;
    a chassis;
    a stabilizer bar connecting the vehicle body to the chassis;

an actuator assembly operatively connected between the stabilizer bar and the vehicle body for selectively controlling the position of the stabilizer bar, the actuator assembly being operable to selectively lock and unlock the stabilizer bar in position relative to the vehicle chassis and vehicle body to provide structural support, the actuator assembly including, an actuator having a first rack and a second rack, a rotatable drive pinion in operative engagement with the first and second racks wherein substantially linear movement of the first and second racks in opposite directions causes rotational movement of the drive pinion; and a locking mechanism selectively moveable between a first position, wherein the locking mechanism prevents rotation of the drive pinion and linear movement of the first and second racks toward a retracted position and an extended position, and a second position, wherein the locking mechanism allows rotation of the drive pinion and linear movement of the first and second racks.

11. The vehicle suspension system defined in claim 10 wherein the actuator has a first rack and a second rack that are movable in opposite directions, and are configured to move the actuator between any one of an infinite number of positions defined between a fully extended position and a fully retracted position.

12. The vehicle suspension system defined in claim 11 wherein the locking mechanism comprises a scroll that is in operative engagement with the drive pinion for rotation therewith; and a pin that is configured to be selectively engaged in a cavity provided in the scroll to prevent rotation of the scroll.

13. The vehicle suspension system defined in claim 12 wherein the locking mechanism further comprises a solenoid, wherein the solenoid is selectively operable between a first actuated position and a second non-actuated position.

14. The vehicle suspension system defined in claim 13 wherein the pin is in one of an extended position and a partially extended position when the solenoid is in the non-actuated position and the pin is in a retracted position when the solenoid is in the actuated position.

15. The vehicle suspension system defined in claim 14 wherein the cavity is located on the scroll such that the pin engagement with the cavity locks the actuator in a position that is substantially at a mid-point between the extended position and the retracted position.

16. The vehicle suspension system defined in claim 15 wherein the solenoid is actuated to retract the pin from engagement with the scroll and to unlock the actuator.

17. The vehicle suspension system defined in claim 15 wherein locking the actuator locks the stabilizer bar in place relative to the vehicle chassis.

18. The vehicle suspension system defined in claim 17 wherein unlocking the scroll allows the actuator to move substantially unrestrained between the fully extended position and the fully retracted position.

19. An actuator assembly comprising:

an actuator having a first rack and a second rack configured for substantially linear movement relative to each other in opposite directions;

a rotatable drive pinion in operative engagement with the first and second racks wherein the substantially linear movement of the first and second racks in opposite directions causes rotational movement of the drive pinion;

a rotatable scroll in operative engagement with the drive pinion for rotation therewith, the scroll having a cavity formed therein; and a locking mechanism including a pin, the locking mechanism being selectively moveable between a first position, wherein the pin of the locking mechanism engages the cavity of the scroll to prevent rotation of the scroll, the drive pinion, and linear movement of the first and second racks, and a second position, wherein the pin of the locking mechanism disengages from the cavity of the scroll to allow rotation of the scroll, the drive pinion, and linear movement of the first and second racks.

* * * * *